May 16, 1933.  F. T. MACKLIN ET AL  1,909,203

SEAL

Filed May 9, 1931

Inventor
Frederick T. Macklin
Daniel G. Fries

By Murray & Zugelter
Attorneys

Patented May 16, 1933

1,909,203

UNITED STATES PATENT OFFICE

FREDERICK T. MACKLIN AND DANIEL G. FRIES, OF COVINGTON, KENTUCKY

SEAL

Application filed May 9, 1931. Serial No. 536,268.

This invention relates to a combined seal structure and fastening device and has for an object the provision of a simple and relatively inexpensive fastening device so arranged that it cannot be removed without rendering apparent the fact that the device has been tampered with.

Another object is to provide in a device of this kind the combination of a special screw and threaded member cooperating in such manner that the threaded member may be entered on the screw but cannot again be removed therefrom without such breakage as would render its subsequent use conspicuous as a telltale of the unauthorized removal.

Another object is to provide in a device of this kind which is especially adaptable to the combined use of mounting automobile license plates upon the vehicle and the prevention of surreptitious removal or exchange of license plates.

These and other objects are attained by the means described herein and disclosed in the accompanying drawing, in which.

Figure 5:
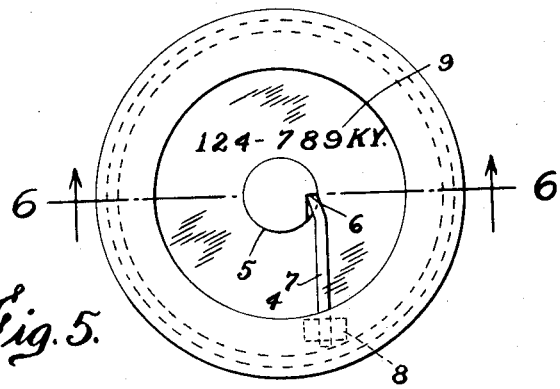
Fig. 5 is an enlarged top plan view of a device of the invention as applied to automobile license plates.
Figure 2:
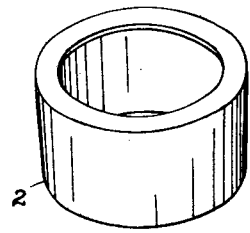
Fig. 2 is a perspective view of an inner shell forming a detail of the invention.
Figure 6:
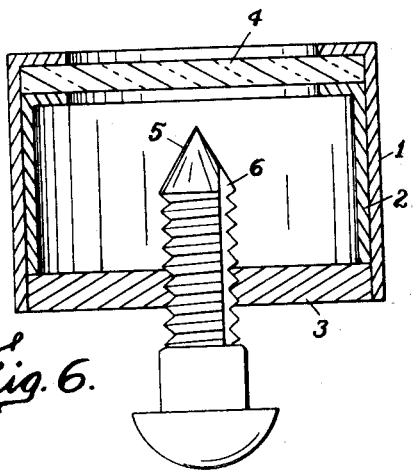
Fig. 6 is a cross sectional view taken on line 6—6 of Fig. 5.
Figure 1:
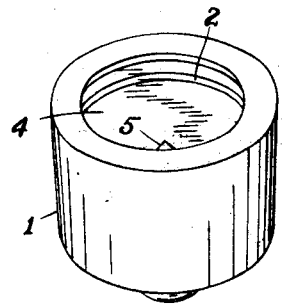
Fig. 1 is a perspective view of a device of the invention.
Figure 3:
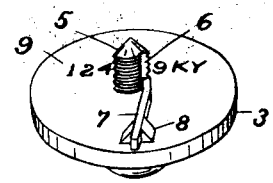
Fig. 3 is a perspective view showing a detail of the device with the casing and side opening members removed.
Figure 4:
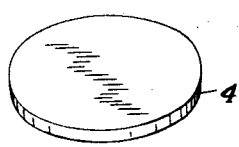
Fig. 4 is a perspective view of a breakable telltale member of the device.

The device comprises an outer shell 1 having an overhanging flange at its one end, in which shell or casing is slidably inserted a flanged ring 2 and which is retained against removal by the mounting of the closure disc 3 by any of the methods hereinafter referred to. Intermediate the flanges of the shell 1 and ring 2 is inserted a telltale disc 4 which is preferably made of glass or some other transparent breakable but not readily bendable material. The disc 3 is preferably threaded centrally for receiving a special screw 5 having a longitudinal channel cut therein to provide a shoulder 6. A leaf 7 of suitable material such as spring steel is secured, as by welding to the blocks 8 so that its free end will yieldingly drop into the channel in the screw in such relation as to firmly abut the shoulder 6 of the channel and preclude rotation of the disc 3 in such direction as to unscrew the disc from said screw. When the disc and its associated housing or cover is turned in the opposite direction the pawl 7 rides over the threads and permits ready connection of the member. When the devices are used for sealing identified objects or mechanisms, the serial number or other indicia of the mechanism may be stamped or printed on the disc 3 in such way as to be visible through the telltale member 4. With the members 1, 2, 3 and 4 in position, the members 1 and 3 are welded, crimped or otherwise secretly secured together, whereupon the seals are ready for mounting upon the special screws 5. The screw would be placed through the usual perforation provided in the vehicle and through the hole or slot in a license plate with the point extending outwardly. The assembled cover would then be screwed on and turned until the license plate or other member were tightly clamped in position. Thereafter it is impossible to remove the cover without breaking the glass telltale 4 or placing such force upon the device as would snap the member 7. The pawl 7 however, withstands severe strain so that breakage thereof by a force applied to the casing is quite unlikely. Breaking off or fracture of the pawl 7 however would readily be apparent to anyone who might look through the transparent telltale member 4.

In use one or more of the devices of the invention would be placed upon each license tag, meter casing or in any other location wherein tampering is forbidden by law or by utilities companies or the like, the structure serving to firmly hold the parts of the desired structure in position.

In the case of automobile license tags, police authorities noting that the telltale member 4 was absent or fractured would readily be apprised by that very fact of the probability of some irregularity which would warrant question of the driver or further examination of the car. In the event that a given car were suspected of being a stolen car, police authorities could readily wipe the dust from the glass and inspect the interior to determine whether the pawl 7 had been forced or fractured and also whether the identification indicia 9 on the inside face of disc 3 corresponded with the license plates of the car.

It is to be understood that the number of uses for devices of this invention are wide and varied and that the invention is not limited to the specific construction illustrated since the details of structure may be modified variously within the spirit of this invention and within the scope of the drawing.

What is claimed is:

1. An attaching and sealing device, having in combination a threaded shank, a hollow member having therein a threaded perforation for receiving said threaded shank, cooperating means on said shank and a hollow member for precluding relative rotation of the threaded members in the direction of separation and a transparent breakable member closing one end of the hollow member and affording inspection of the last mentioned means from the outside of the device.

2. In a device of the class described the combination of a hollow chamber member having a transparent breakable end closure member, a closure for the opposite end of said chamber member fixedly and inaccessibly secured thereto, said last mentioned closure having a screw receiving threaded perforation therein, a pawl mounted on said closure member interiorly of the hollow chamber and extending over the threaded perforation therein and a screw member having a longitudinal slot providing a shoulder at one side for abutment with the end of the pawl when the chamber member is rotated in an attempt to unscrew the chamber member from the screw.

3. In combination a hollow cylindrical member having a frangible transparent closure mounted at one end and a solid threadedly apertured closure secretly secured at its opposite end, said last mentioned closure member being adapted to threadedly receive a screw in entering relation and means within said cylindrical body cooperating with the screw for precluding reacting motion of the screw and cylindrical member.

4. An automobile license plate mounting and seal structure comprising a cylindrical housing, a transparent closure for one end of the housing, a disc secretly secured to the opposite end of the closure, said disc having a threaded perforation therein, a longitudinally slotted screw for entry in said perforation and means fixed on said disc for precluding relative rotation of the disc and screw in one direction and permitting relative rotation thereof in the opposite direction.

5. In a seal of the class described the combination of a hollow body, a transparent closure fixed in one end thereof, a fixed closure for the opposite end thereof adapted to receive on the interiorly disposed face suitable identification indicia, a fastening member extending through said last mentioned closure and a holding member for the fastening member permitting entry of the fastening member into the seal body and precluding removal of the fastening member except by access after destruction of the transparent closure.

In testimony whereof, we have hereunto subscribed our names this 8th day of May, 1931.

FREDERICK T. MACKLIN.
DANIEL G. FRIES.